United States Patent [19]

Douglas

[11] 4,380,247

[45] Apr. 19, 1983

[54] SAFETY GUARD FOR VALVE

[75] Inventor: Fred O. Douglas, Columbus, Ga.

[73] Assignee: W. C. Bradley Co., Columbus, Ga.

[21] Appl. No.: 250,203

[22] Filed: Apr. 2, 1981

[51] Int. Cl.³ .................................. F16K 35/00
[52] U.S. Cl. .......................... 137/382; 220/85 P
[58] Field of Search .................. 220/85 P; 137/382

[56] References Cited

U.S. PATENT DOCUMENTS

| 961,959 | 6/1910 | Herfurth | 137/382 |
| 3,623,498 | 11/1971 | Monahan | 137/382 |
| 3,696,964 | 10/1972 | Deakin | 220/85 P |
| 4,030,628 | 6/1977 | Hippert, Jr. | 220/85 P |
| 4,254,888 | 3/1981 | Chandler | 220/85 |

Primary Examiner—A. Michael Chambers
Attorney, Agent, or Firm—Newton, Hopkins & Ormsby

[57] ABSTRACT

A two-part metal security guard fits inside of the existing curved shield at the top of a conventional LP gas tank and partly encloses the gas outlet valve of the tank so as to render the same inaccessible to children as well as other unauthorized persons. The safety guard affords adequate ventilation, being open at two ends, and does not obstruct the adjacent pressure relief device. The safety guard can be locked with a padlock.

3 Claims, 4 Drawing Figures

SAFETY GUARD FOR VALVE

BACKGROUND OF THE INVENTION

The object of the invention is to provide an effective low cost safety guard or partial enclosure for the outlet valve at the top of a conventional LP gas tank so that children cannot taper with or open the valve and possibly ignite a grill or start a fire.

Features of the guard, in addition to its simplicity, include the provision of adequate ventilation around the valve, non-obstruction of the nearby pressure relief unit, lockability with a simple padlock, and the ability of the safety guard to fit inside of the existing arcuate shield at the top of the tank which surrounds and protects the valve from heavy blows likely to break it off.

While a number of valve guards and locks are known in the prior art, none is deemed suitable to fulfill the particular need which this invention satisfies in an efficient and economical manner.

U.S. Pat. No. 1,947,081 shows a guard for valves which includes a hinged housing member and a coacting lock plate. Such a guard is not suitable for the present application because adequate ventilation inside of the guard is not provided for.

U.S. Pat. No. 3,156,256 shows essentially a one-piece lockable valve guard which blocks rotation of the valve stem handle. The simplified safety guard in accordance with this invention renders the valve handle inaccessible without the necessity for actually locking it against rotation, and thus the device can be manufactured more cheaply with less precise manufacturing tolerances.

Other features and advantages of the invention will become apparent during the course of the following detailed description.

BRIEF DESCRIPTION OF THE DRAWINGS

FIG. 4 is a plan view of the guard on a somewhat reduced scale.

DETAILED DESCRIPTION

Figure 1:
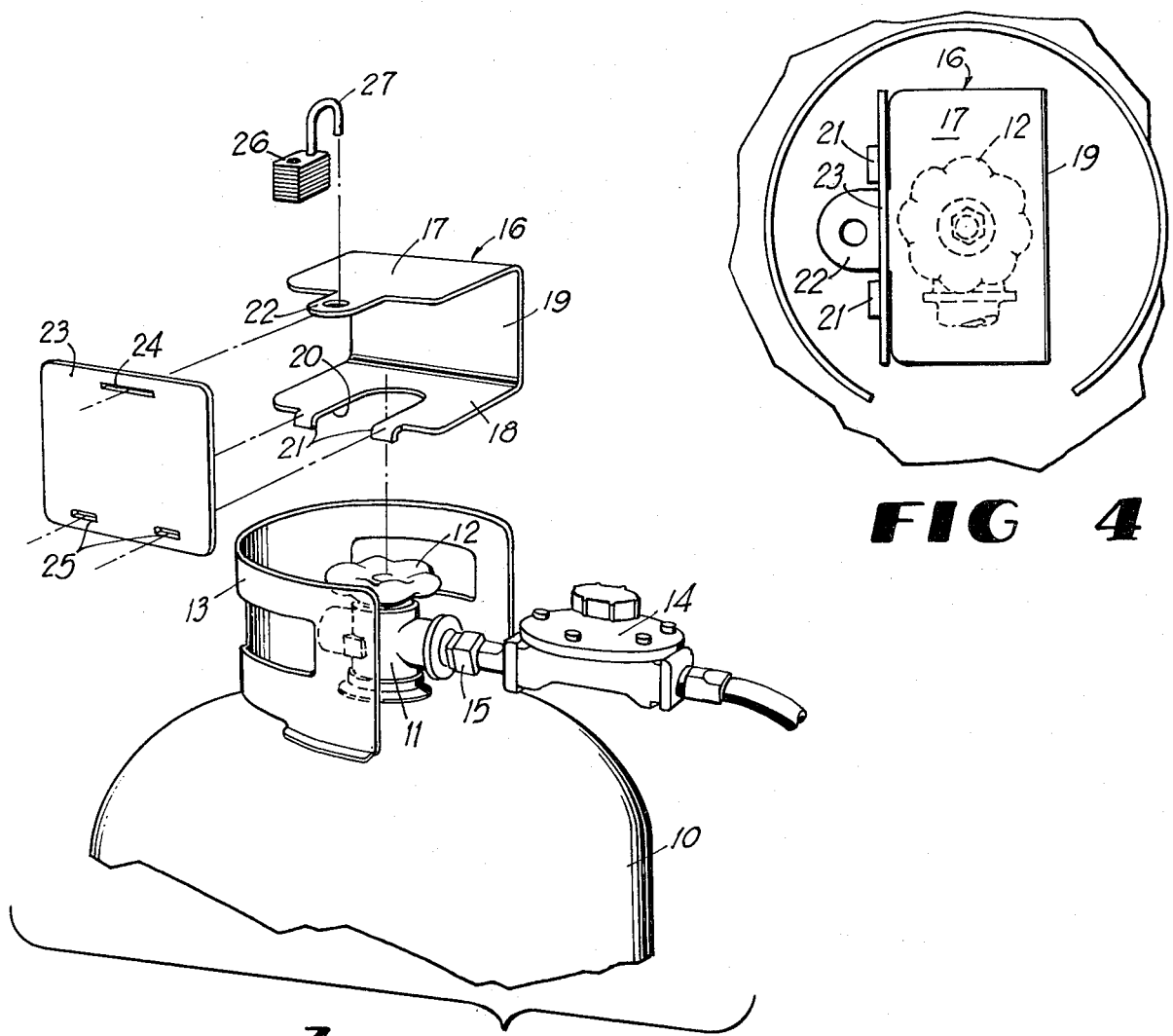
FIG. 1 is an exploded perspective view of the invention.
Figure 2:
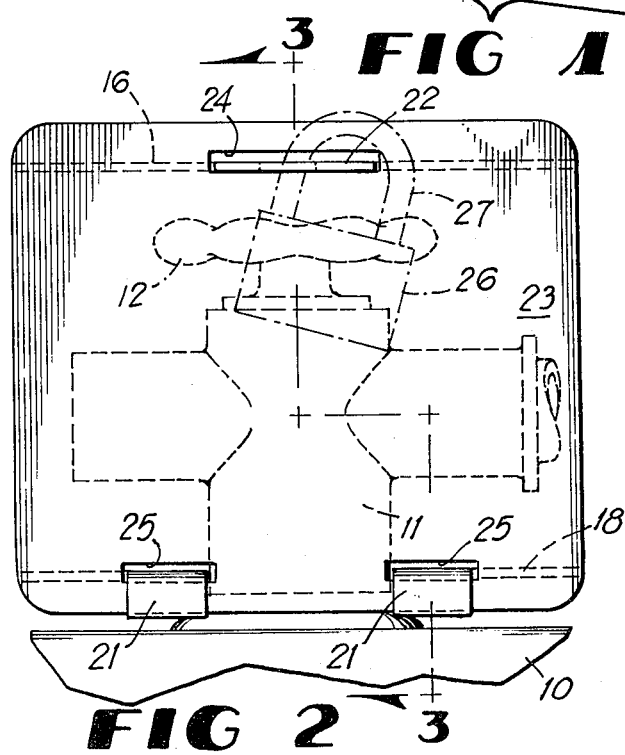
FIG. 2 is a side elevation of the invention in an assembled state.

Referring to the drawings in detail wherein like numerals designate like parts, a conventional LP gas tank 10 includes a top outlet valve 11 having an operating handle 12. An existing arcuate shield 13 partly surrounds the valve 11 to protect it from heavy blows. At the open side of the shield 13, a pressure regulator device 14 spaced laterally of the valve 11 is connected with the valve by fitting means 15 according to conventional practice. A two-part safety guard for the valve 11 according to the present invention consists of a U-shaped body portion 16 having spaced parallel top and bottom walls 17 and 18 and a connecting side wall 19. The bottom wall 18 has a large slot 20 formed centrally therein to receive the base of the valve 11, FIG. 3, near its connection with the top of the tank 10. A pair of downturned locking tongues 21 for the bottom plate 18 are provided at the opposite sides of the slot 20. A single central apertured locking tab 22 is carried by the upper plate 17 of body portion 16 as shown.

A coacting flat substantially rectangular guard plate 23 for the open side of the U-shaped body portion 16 is provided, and this plate includes a centered upper slot 24 for the reception of tab 22, and a pair of spaced lower slots 25 for the reception of the two tongues 21, as shown. A conventional padlock 26 is utilized to secure the two-part safety guard in assembled relationship around the valve 11 with the shackle 27 of the lock engaging through the aperture of the tab 22 after the latter has been inserted through the slot 24 and the tongues 21 through the slots 25.

Figure 3:
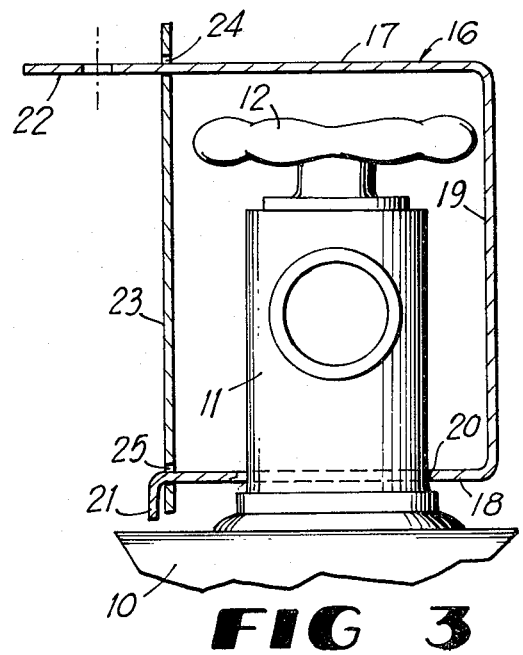
FIG. 3 is a vertical section taken on line 3—3 of FIG. 2.

The resulting guard assembly is a box-like structure having two open ends as viewed in FIG. 3 so as to afford adequate ventilation around the valve. The plate component 23 is in abutment with the opposing edges of top and bottom plates 17 and 18 and parallel to the opposing side wall 19. The entire guard assembly can be fitted inside of the existing shield 13. It does not obstruct the adjacent pressure regulator device 14. However, the two part guard does, very effectively, lock access by a child or intruder to the valve handle 21 and therefore the valve 11 cannot be opened until the padlock is removed and the two-part safety guard separated and removed.

The use of the invention does not require any altering or damaging of the tank 10 or its existing components. The invention is characterized by extreme simplicity and economy, and it is very effective in accomplishing the objectives of preventing children from turning on the valve 11 while the guard is in place.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A two part separable safety guard for a valve comprising a substantially U-shaped body portion having spaced top and bottom walls which are disposed horizontally in use and a connecting vertical wall, the opposite ends of the body portion being open, the bottom wall of the body portion having a central slot opening through its leading end to receive the base of a valve to which the guard is applied, the leading edges of the top and bottom walls of the body portion being in vertical alignment, locking elements on the leading edges of the top and bottom walls of the body portion, and a substantially flat locking plate adapted to be placed against the leading edges in spaced substantially parallel relationship to the connecting vertical wall, and said locking plate having apertures formed therethrough receiving said locking elements of the top and bottom walls lockingly.

2. A safety guard for a valve comprising a substantially U-shaped body portion having spaced top and bottom walls and a connecting side wall, said bottom wall having an opening formed through its leading edge adapted to receive the base of a valve to which the guard is applied, said bottom wall having a pair of locking tongues at its leading edge on opposite sides of said opening, said top wall having a center apertured locking tab projecting forwardly of its leading edge, the leading edges of the top and bottom walls being in vertical alignment, and a coacting flat locking plate including an upper slot to receive said apertured locking tab and two spaced lower slots to receive said pair of locking tongues of the bottom wall, said pair of locking tongues extending substantially perpendicular to the plane of the bottom wall whereby they may engage said two spaced lower slots of the locking plate interlockingly, and said flat locking plate abutting the vertically aligned edges of the top and bottom walls of the U-shaped body portion when said locking tongues and locking tab are in said slots of the flat locking plate, the aperture of the locking tab being adapted to receive the shackle of a padlock.

3. A safety guard for a gas tank outlet valve having an existing arcuate shield partly surrounding it, said guard being adapted for placement inside of the existing shield in partly enclosing relationship to said valve and comprising a substantially U-shaped body portion having spaced top and bottom walls and a connecting side wall, said bottom wall having an open ended slot formed therein to receive a base portion of the valve and two locking tongues on opposite sides of said slot, said top wall having a single centered apertured locking tab, a coacting locking plate for said body portion including an upper slot to receive said tab and two lower slots to receive said tongues, said plate abutting opposing edges of said top and bottom walls and being in spaced substantially parallel relationship to said side wall with said valve located between said plate and said side wall, opposite ends of said safety guard then being open for free ventilation, a padlock for the safety guard having a shackle to engage through the aperture of said locking tab, and said two locking tongues comprising short downturned tongues on the bottom wall of said body portion and projecting forwardly from one edge of the bottom wall, said apertured locking tab lying in the same plane as said top wall and projecting forwardly from one edge thereof, which edge is aligned with said one edge of the bottom wall, and said locking plate being a flat plate abutting said edges of the top and bottom walls of the body portion when said tongues and tab are in said slots.

* * * * *